United States Patent [19]
Hornung
[11] 3,713,109
[45] Jan. 23, 1973

[54] DIMINISHED MATRIX METHOD OF I/O CONTROL

[75] Inventor: Louis Michael Hornung, Austin, Tex.

[73] Assignee: International Business Machines Corporation, Armonk, N.Y.

[22] Filed: Dec. 30, 1970

[21] Appl. No.: 102,740

[52] U.S. Cl. ....................340/172.5
[51] Int. Cl. ....................G06f 3/00
[58] Field of Search ....................340/172.5

[56] References Cited

UNITED STATES PATENTS

| | | | |
|---|---|---|---|
| 3,274,561 | 9/1966 | Hallman et al. | 340/172.5 |
| 3,408,632 | 10/1968 | Hauck | 340/172.5 |
| 3,425,037 | 1/1969 | Patterson et al. | 340/172.5 |
| 3,432,813 | 3/1969 | Annunziata et al. | 340/172.5 |
| 3,526,878 | 9/1970 | Bennett et al. | 340/172.5 |
| 3,539,998 | 11/1970 | Belcher et al. | 340/172.5 |

*Primary Examiner*—Paul J. Henon
*Assistant Examiner*—Sydney R. Chirlin
*Attorney*—Hanifin and Jancin and J. L. Jackson

[57] ABSTRACT

A technique of I/O control in which an I/O instruction contains a three-bit working device code (WDC) which is used to table lookup the actual device code (ADC) of the device to be serviced. The ADC is transmitted to all of the devices which then compare the code with their wired-in codes and the addressed device then stores the WCD which is simultaneously transmitted. During interrupt requests the WDC stored in the devices is decoded and used to select one of eight interrupt request lines. The eight interrupt request lines are applied to a matrix which determines which of the eight is of highest order priority. The output of the matrix is encoded to provide a WDC corresponding to the device of highest order priority and transmitted to all of the devices to identify the device which is to hive it's interrupt request honored. The number of ADC's may be greater than the number of WDC's allowing for the attachment of a number of devices in excess of the size of the matrix and likewise in excess of other facilities in the I/O adapter. Further, provision is made for the attachment of devices which may be identical in all respects including wired-in codes for identifying the devices.

14 Claims, 10 Drawing Figures

INVENTOR
LOUIS M. HORNUNG
John [signature]
ATTORNEY

I/O INSTRUCTION FORMAT:

| OP CODE | FUNCTION | WDC | REG ADDR |
|---|---|---|---|
| 0 0 1 1 | 4 BITS | 3 BITS | 5 BITS |

FIG. 3a

REGISTER ARITHMETIC FORMAT:

| OP CODE | FUNCTION | Q REG ADDR | P REG ADDR |
|---|---|---|---|
| 0 0 0 1 | 2 BITS | 5 BITS | 5 BITS |

FIG. 3b

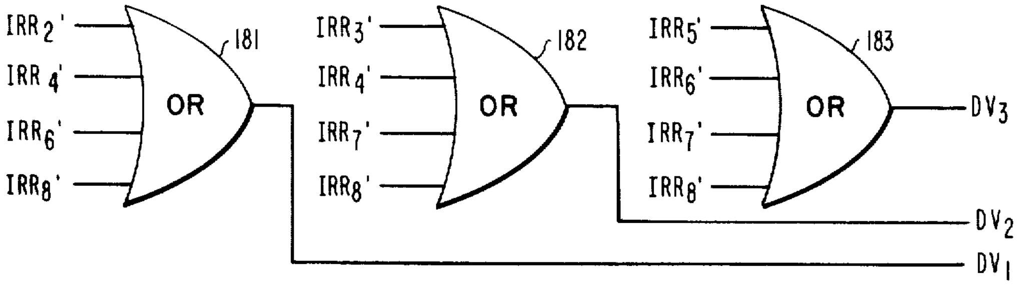
FIG. 6
| LINE | PRIORITY | DEVICE CODE | $DV_3$ | $DV_2$ | $DV_1$ |
|---|---|---|---|---|---|
| $IRR_1$ | HIGHEST | 0 | 0 | 0 | 0 |
| $IRR_2$ | ↑ | 1 | 0 | 0 | 1 |
| $IRR_3$ | | 2 | 0 | 1 | 0 |
| $IRR_4$ | | 3 | 0 | 1 | 1 |
| • | | • | • | | |
| • | | • | • | | |
| • | ↓ | • | • | | |
| $IRR_8$ | LOWEST | 7 | 1 | 1 | 1 |
FIG. 7
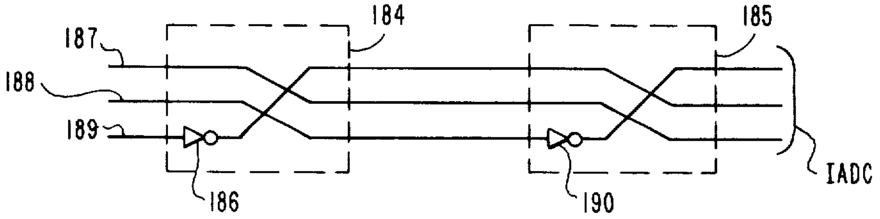
FIG. 8
| IDENTICALLY ADDRESSED DEVICE CODE CHART | | | | | | | |
|---|---|---|---|---|---|---|---|
| TRANSMITTED CODE | RECEIVED CODE | | | | | | DEVICE SELECTED |
| | FIRST DEVICE | SECOND DEVICE | THIRD DEVICE | FOURTH DEVICE | FIFTH DEVICE | SIXTH DEVICE | |
| 000 | 000 | 100 | 110 | 111 | 011 | 001 | FIRST |
| 001 | 001 | 000 | 100 | 110 | 111 | 011 | SECOND |
| 011 | 011 | 001 | 000 | 100 | 110 | 111 | THIRD |
| 111 | 111 | 011 | 001 | 000 | 100 | 110 | FOURTH |
| 110 | 110 | 111 | 011 | 001 | 000 | 100 | FIFTH |
| 100 | 100 | 110 | 111 | 011 | 001 | 000 | SIXTH |
FIG. 9

DIMINISHED MATRIX METHOD OF I/O CONTROL

CROSS REFERENCE TO RELATED APPLICATIONS

Working Device Code Method of I/O Control, by Louis M. Hornung, U.S. Pat. No. 3,668,651.

BACKGROUND OF THE INVENTION

1. Field of the Invention

The present invention relates to I/O control of devices attached to a central processing unit in general, and more particularly to an indirect addressing technique for I/O control in which the priorities of servicing of the devices whenever they request interrupt of other processing activity can be assigned by the supervisory program by selective assignment of working device codes to the devices such that the actual wiring or hookup of the system is unimportant as far as priority of control is concerned. The invention provides a quality of expandability in a unique way and is of particular interest to systems whose applications by way of the variety of their used I/O devices require the attachment of a large number of devices.

2. Description of Prior Art

In the related application entitled "Working Device Code Method of I/O Control", a technique of utilizing a working device code for indirect addressing of memory to provide an actual device code for I/O control is disclosed. In this technique each of the I/O devices has a different wired actual device code. The example given in the application is 32 I/O devices. In operation, the working device code which is contained in the I/O instruction is utilized, by means of table lookup, to obtain the actual device code associated with a particular working device code and this actual device code then is transmitted to all of the I/O devices such that the device having a similar wired actual device code can determine that it is the device to be addressed by the I/O instruction. After identifying that it is the device addressed, the I/O device stores information regarding the function to be performed. During subsequent interrupt operations, each of the devices which have a single interrupt request line activates it's interrupt request line, and a matrix in the central processor is used to determine which of several devices simultaneously requesting service is of the highest order priority. Priority, therefore, in this type of system is determined by the manner in which the devices are connected to the matrix. While this type of system provides good flexibility such that program sharing can be accomplished, the rigidity of the actual hookup and the requirement that there be an interrupt request line for each device hooked on to the system is for some applications undesirable. In addition if each of the devices has a seperate interrupt request line in the example given a matrix of 32 variables is required and in addition the address decoders and I/OAR stores must be relatively large. The expense of the large matrix, decoders, and I/OAR stores may preclude the system from cost sensitive single function applications requiring but a small fraction of the 32 devices.

Further, since each of the I/O devices must have a unique actual device code, the system is further constrained such that unless provision for field modification of the wired-in actual device code is made for applications requiring identical I/O devices it cannot be used. Field modification of identifiers, as is well known in the art is highly undesirable.

These and the other problems discussed in the background of invention portion of the forereferenced application are solved by the present invention.

BRIEF SUMMARY OF THE INVENTION

Briefly, there is provided a system and technique of I/O control in which the devices in the system which are attached in a star configuration to the processor, each have a unique actual device code which is wired into the I/O device and a working device code which is loaded by the I/O instruction. During execution of an I/O instruction, the instruction instead of containing the actual device code of the device will contain a working device code. During the execution of the instruction, the working device code is used to address a portion of memory in which the actual device codes are stored. The actual device code associated with a particular working device code is output to the I/O devices. A comparison between the local actual device code wired into each I/O device and the transmitted actual device code is executed to determine which I/O device has been selected. The device which is selected stores the working device code which is simultaneously output on another buss in a working device code register in the device. The function to be performed then by the I/O instruction is stored also in the selected device.

In addition to being transmitted to the I/O devices, the working device code from the I/O instruction is applied to an address decoder which decodes the working device code to thereby select an input/output address register which will be used by the corresponding I/O device during subsequent processing. Stored in the input/output address register is the address in memory which will be utilized by the I/O device. This address is indexed in a progressive binary sequence of addresses with each interrupt in order that a plurality of interrupts may result from the execution of a single I/O instruction.

Each of the I/O devices is connected by means of, for instance, eight interrupt request lines to a matrix in the central processing unit. The matrix determines which of the I/O devices is of highest order priority when more than one I/O device is requesting service when an interrupt is allowed and an interrupt sequence is entered. The particular interrupt request line which is activated by a device when it requires servicing is determined by decoding the working device code assigned to and stored in the I/O device. The output of the matrix is used to address the input/output address register store to obtain the address in memory which is associated with the particular device which is of highest order priority. In addition, the output of the matrix is applied to a device code encoder which provides a code out onto the device buss so that the particular device selected can determine, by comparing the transmitted code to its own stored working device code, whether it has been selected.

A preferred embodiment of the invention utilizes 32 actual device codes which are defined by a five-bit code. Eight working device codes are used. Only devices which have been activated by means of an I/O instruction are permitted to request for interrupt. Hence, 32 devices, each having a unique actual device code, may be attached and operated in a system having but eight interrupt request lines and eight I/O address registers. The limited facilities of the CPU which are provided for I/O control are shared among the attached devices so as to reduce the number of circuits and I/OAR stores.

Further provisions is made for adding tandem devices having the same actual device code by utilization of an additional code called identically addressed device code which is permuted through the tandemly connected devices to thereby select only one of the devices even though the devices have the same actual device codes and working device codes.

Brief Description of the Drawings

FIGS. 3*a* and 3*b* illustrate the I/O instruction format and register arithmetic format which can be used in a matrix type I/O system employing the diminished matrix method;

FIG. 6 is a logical diagram of the device code encoder of FIGS. 4 and 5;

FIG. 7 is a truth table illustrating the operation of the device coder encoder of FIG. 6;

FIG. 8 is a drawing illustrating the permutation units of FIG. 5; and

FIG. 9 is a truth table illustrating the operation of the permutation units of FIGS. 5 and 8.

DETAILED DESCRIPTION OF THE DRAWINGS

Figure 1:
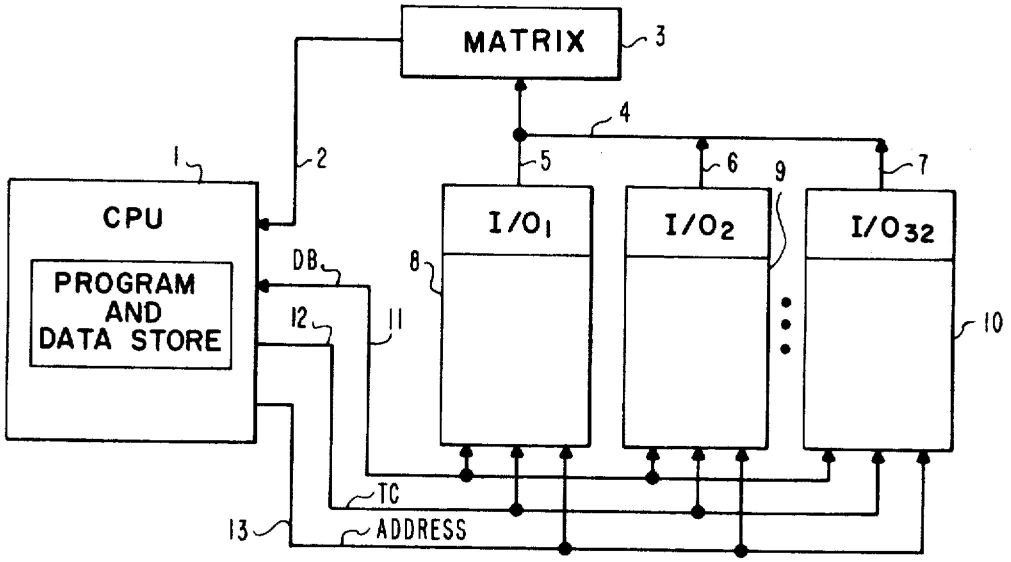
FIG. 1 is an overall diagram illustrating a matrix type hookup of a CPU and associated I/O devices.

Refer first to FIG. 1 which is an overall block diagram, illustrating a central processing unit 1 associated I/O devices attached to it in a star configuration with a matrix type of priority interrupt selection. Star as used herein means a spokewheel configuration in which each of the devices is connected directly to the CPU at the hub as distinguished from a tandem configuration in which a first device connects to the CPU and a second device connects to the first device, a third device connects to the second, etc., with only the first device being connected directly to the CPU. The CPU 1 has a stored program and further includes the data store.

This type of CPU is well known and only the parts of the CPU which are essential to an understanding of the present invention will be discussed. A number of I/O devices 8, 9 and 10 are shown connected to CPU 1. Each I/O device is connected by the data buss 11, a timing and control buss 12 and an address buss 13 to the CPU 1. In addition, each of the I/O devices is connected to the matrix 3 which in turn is connected by means of line 2 to the CPU 1. For purposes of subsequent description it will be assumed that the working device code (WDC) employed in the system is three-bits in length. Thus, eight interrupt request lines connect I/O device 8 along line 5 to matrix 3 while the same holds true along lines 6, 7 and 4 with respect to I/O devices 9 and 10. This particular connection will be described in more detail in connection with the description of FIGS. 4 and 5. The matrix 3, as above briefly discussed, in the event that several devices simultaneously request service determines which of the devices is of the highest order priority and makes this known to the processor 1 along line 2. The processor 1 then outputs a WDC along line 13 to the devices which corresponds to the WDC assigned to the device which is of the highest order priority which was selected by matrix 3.

Figure 2:
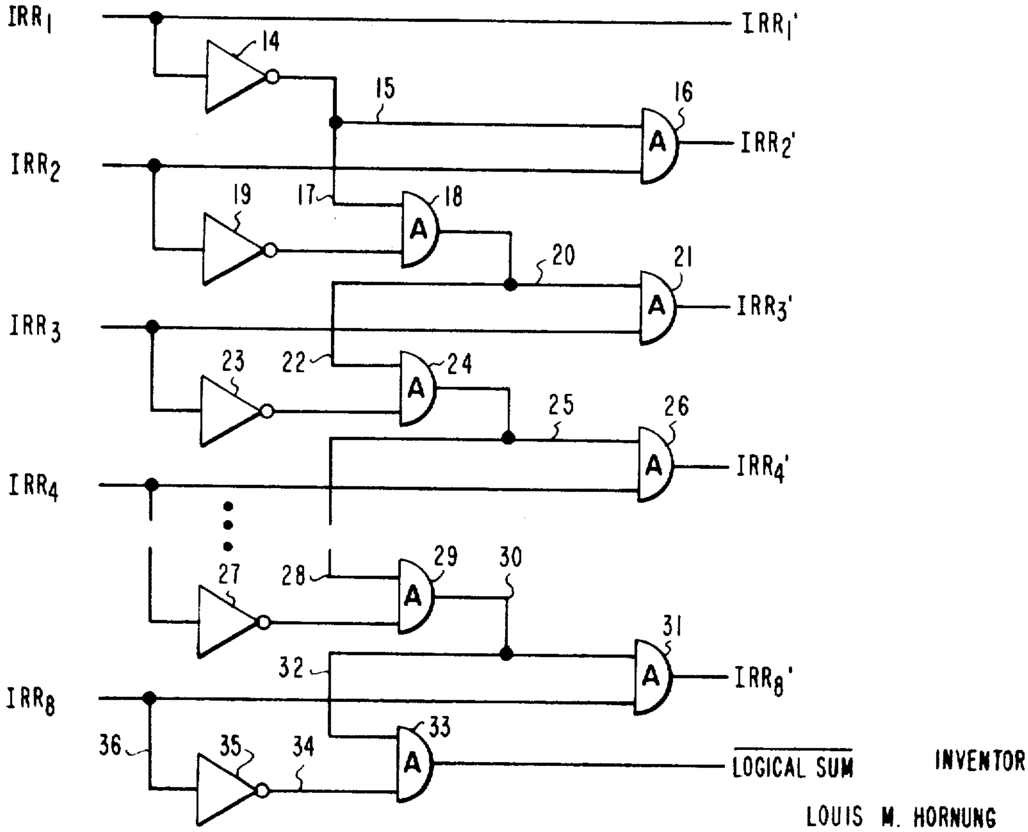
FIG. 2 is a detailed logical diagram of the matrix of FIG. 1.

Refer next to FIG. 2 which is a detailed logical diagram of the matrix 3 of FIG. 1. As shown in FIG. 2 interrupt request lines IRR 1 – IRR 8 from the I/O devices constitute the inputs to the matrix while interrupt request line outputs IRR 1′ – IRR 8′ constitute the outputs of the matrix. The primes are not intended to indicate negation but are used to distinguish between the inputs and outputs of the matrix since there is a strong connection between an input and the corresponding output. Input request line IRR 1 is the highest order priority line since it is connected straight through the matrix and appears as IRR 1′. Interrupt request line IRR 8 is the lowest order priority. As shown in FIG. 2, interrupt request line IRR 1 is connected through inverter 14 along line 15 to AND gate 16 which also receives an input from IRR 2. The output of the inverter 14 is also applied along line 17 to AND gate 18 which in turn receives the inverted IRR 2 signal through inverter 19. The output of AND gate 18 is applied along line 20 to AND gate 21 which is the AND output of IRR 3. AND gate 21 likewise receives an input from IRR 3. The output of AND gate 18 is also applied along line 22 to AND gate 24 which receives the inverted signal from IRR 3 through inverter 23. The output of AND gate 24 is applied along line 25 to AND gate 26 which also receives an input from IRR 4. This sequence of connections carries on through the final stage 8 as shown. Thus inverter 27 applies an inverted signal from the previous higher priority order stage to AND gate 29 which also receives an input along line 28 from the previous higher priority order stage and provides an output along line 30 to AND gate 31 which receives another input from IRR 8. Connected also to IRR 8 along line 36 is an inverter 35 which applies its output to AND gate 33 which receives another input from AND gate 29 along lines 30 and 32 to provide an inverted logical sum output. The inverted logical sum is merely a signal which indicates whether any of the interrupt request lines 1 – 8 are up. Thus, when none of the devices are requesting service, the inverted logical sum signal will be up.

In the following description it will be assumed that a positive logical level applied to an interrupt request line indicates a request while a negative logical level indicates the absence of a request. Likewise, a positive logical level appearing at the output of the matrix will indicate that the associated line is of the highest order priority. Further, the logical level unless both inputs to the AND gate are positive.

As shown in FIG. 2 a positive level applied to IRR 1 will result in a positive level appearing at the output of IRR 1'. All other matrix outputs must be negative except for the inverse logical sum output. This will be true regardless of whether other lower priority interrupt request lines have positive signals applied to them due to the interconnection of the inverters and AND gates from stage to stage. Thus, assume for purposes of illustration that positive signals are applied to both IRR 1 and IRR 2. The output from AND gate 16 which indicates that IRR 2' is of the highest priority will be inhibited by the inversion of the positive signal applied to IRR 1 by inverter 14 since this will result in a negative signal being applied along line 15 to the input of AND gate 16. This negative signal from inverter 14 will likewise be applied along line 17 to the input of AND gate 18 which will cause it to likewise output a negative logical level. Further, the signal from AND gate 18 will likewise by applied to AND gate 24 to cause it to output a negative logical level. Thus, it can be seen that all of the AND gates 18 – 33 will have a negative input applied to them in the event that the signal from inverter 14 is negative. This is accomplished regardless of whether the associated interrupt request lines IRR 2 through IRR 8 have a positive level applied to them.

On the other hand, assume now that IRR 1 has a negative signal applied to it which will, therefore, cause the output from inverter 14 to be positive such that if the signal applied to IRR 2 is positive the output from AND gate 16 will be positive. However, the output from inverter 19 will be a negative logical level when IRR 2 is positive which will cause AND gate 18 to have a negative output and provide the same sort of inhibiting action as previously described. The same holds true throughout the matrix such that IRR 8 can only be selected when no higher order priority lines are selected.

Refer next to FIGS. 3*a* and 3*b*. In FIG. 3*a* is shown the instruction format for an I/O instruction while FIG. 3*b* shows the format of a two-address arithmetic instruction. These formats are shown to facilitate a comparison between the two instructions. In particular, the similarity between the working device code field of the I/O instruction and the Q-register address field of the arithmetic instruction should be noted. As will be later described each of these fields will be used to address memory. Thus, as will later become apparent an I/O instruction can be handled in a manner similar to the arithmetic instruction with the same registers and internal data paths such that no special purpose hardware or restructuring is required since, as shown, the word lengths for both arithmetic and I/O instructions are equal. Further, as shown the WDC field of the I/O instruction which is used to address a portion of memory is only three-bits in length thus allowing a four-bit function field which is needed in a large and diverse I/O system, while the Q register address is five-bits in length which is required for memory addressing during processing but the function field is only two-bits in length which is adequate for arithmetic operations.

Figure 4:
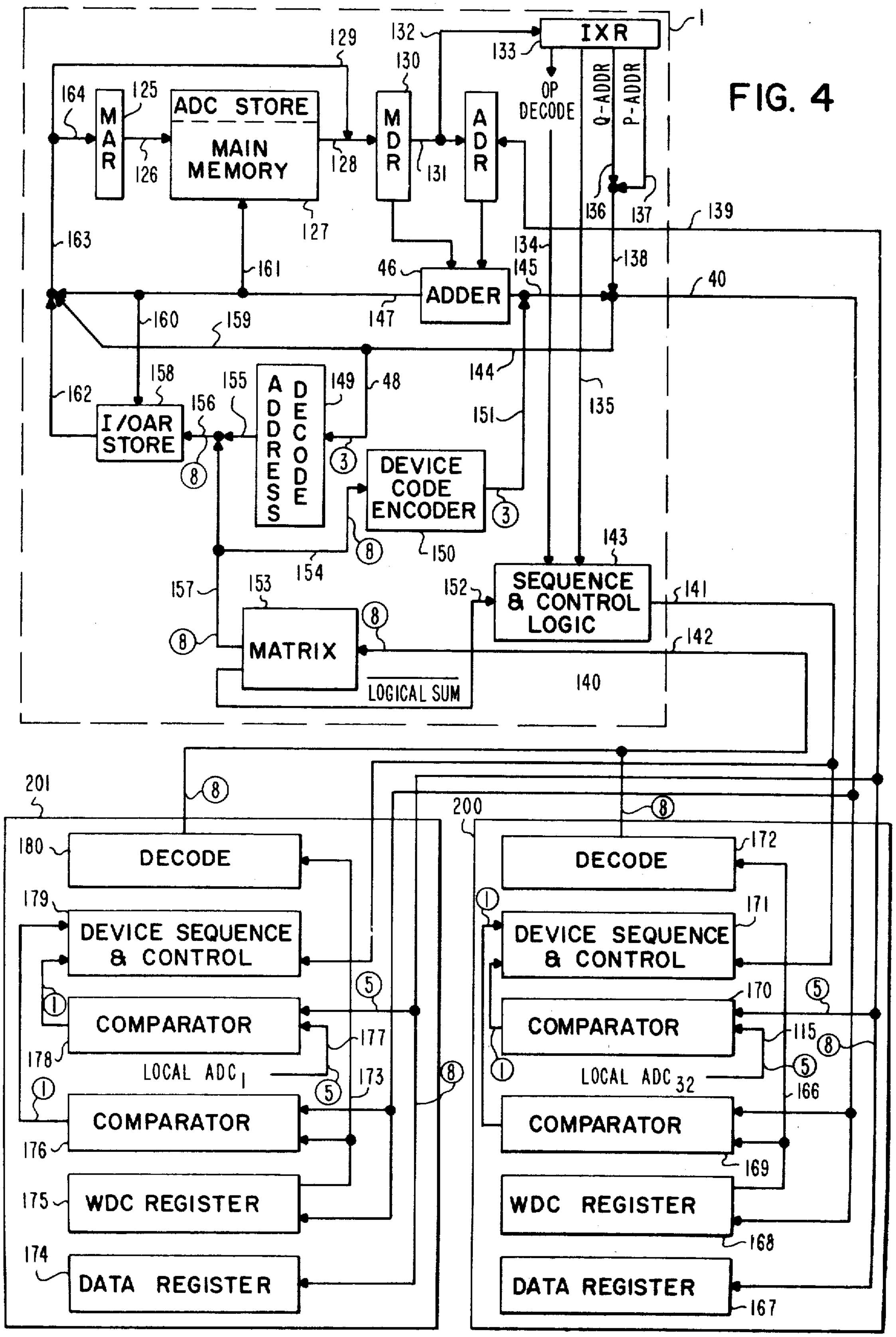
FIG. 4 is a detailed drawing of the CPU and I/O devices of FIG. 1 showing the I/O devices hooked in a star configuration.

For a more detailed description, refer next to FIG. 4. In connection with the description of FIG. 4 the drawings have been simplified by using numeral notations in circles to indicate the number of lines in the various busses. Further, arrows are used to designate data flow which in certain busses such as buss 59 is bidirectional.

As shown in FIG. 4 the CPU 1 is connected to a number of I/O devices by means of the busses. For purposes of illustration there are 32 I/O devices, 200 – 201 shown. In each device as shown by reference to I/O device 200 there is a data register 167 which stores data from the processor or stores data for transfer to the processor along the data buss line 139. Additionally, in each device there is a local device code which hereinafter will be referred to as an actual device code (ADC). This is a unique five-bit code for each device and is wired into the device. The actual device code is applied to a comparator 170 which in addition receives an input along buss 139. When a compare is made a signal is applied to the device sequence and control logic 171 contained in the I/O device. The device sequence and control logic is the particular logic which is associated with the device and its makeup depends on the type of device. The device sequence and control logic is also connected along line 141 to the sequence and control logic 143 contained in the CPU 1 such that the function designated by the CPU 1 can be stored in the I/O device.

Further, the I/O device 200 contains a working device code register 168 which is operative to store the working device code loaded in it from the CPU 1. In addition the working device code register 168 in the I/O device is connected as shown to a comparator 169 and a decode unit 172. The comparator 169 compares the code contained in the working device code register 168 with a code transmitted subsequently from the CPU. Comparator 169 as shown is connected to the working device code register 168. Comparator 169 also receives an input along line 40 from the CPU 1. An indication of whether or not a compare is made is as shown provided to the device sequence and control unit 171. Likewise, as shown the comparator 170 receives an input from the wired device code and receives another input along line 139 from the CPU 1. Comparator 170 as was the case with comparator 169 provides an indication to the device sequence and control unit 171 of whether a compare is made. Finally, as shown the working device code register 168 is connected to the decode unit 172. The decode unit 172 is a conventional decode unit which is adapted to receive the three-bit working device code stored in register 168 and provide a decoding action to select one of the eight interrupt request lines connected to buss 182 in accordance with the working device code stored in register 168.

Refer next to the CPU 1 shown in FIG. 4 which will be described prior to an overall operational description of the CPU 1 and its interaction with the I/O devices. As shown in FIG. 4 the CPU 1 has a conventional memory address register 125 connected along line 126 to the main memory and ADC store 127. The action of the memory address register 125 in addressing the main memory 127 and actual device code store contained in the main memory is conventional. The main memory 127 is connected along line 128 to a main data register 130 which in turn is connected along lines 131 and 132 to instruction register 133. The main data register is also connected along line 131 to an alternate data register 138. Both the main data register 130 and alternate data register 130*a* are connected along lines 210 and 211 respectively to an ADDER 46.

The instruction register 133 is connected to an OP decode line 134 which in turn is connected to the sequence and control logic 143 of the CPU. Additionally, the instruction register is connected along line 135 to the sequence and control logic 143. In general, it is the purpose of the sequence and control logic 143 to detect the nature of an instruction and to steer the CPU through the proper steps to execute the instruction and access the next instruction. The sequence and control logic 143 controls the gating of data along the various data paths, causes memory cycles to be performed as required, and in the case of I/O instructions controls the busses to the devices. The sequence and control logic 143 also controls the operation of an interrupt sequence when a negative signal is received from the matrix 153 via line 152. Referring back to FIGS. 3*a* and 3*b* during execution of an I/O instruction as shown the OP code is four-bits in length and is transmitted along lines 134 to sequence and control logic 143 while the function is four-bits in length and is transmitted along lines 135 to the sequence and control logic 143.

The working device code portion of the word during an I/O instruction is applied to lines 136 which as shown is connected to buss 40 and to lines 144, 159, 163 and 164 to apply the working device code to the memory address register 125.

Further, as shown the ADDER 46 is connected along lines 147 and 161 to the main memory. This ADDER is shown to illustrate, as will later be described, execution of an arithmetic instruction and the storage of the result into the main memory along line 161 in a conventional manner. Gating which is not shown for reasons of simplicity allows the contents of the alternate data register 133, the contents or the compliment of the contents of the main data register 130, or a combination of the foregoing to be input to the ADDER 46. Implied constants, e.g. 1, may also be gated into the adder for purposes of indexing. All of the devices as previously discussed are connected by means of interrupt request lines 142 to a matrix 153. The matrix 153 as described in connection with the description of FIG. 2 is connected along line 152 to the sequence and control logic 143 to signal to that logic when a device is requesting an interrupt. Again, this is a conventional use of the logical sum output of the matrix. The output of the matrix 153 is also applied along lines 157 and 156 to select an address within the I/OAR store 158. As previously described in connection with the description of FIG. 2 only one of the eight lines connected to the I/OAR store is brought up at one time in accordance with the priorities established in the I/O devices by assignment of working device codes. The contents of the I/OAR store 158, which is an address in memory which is associated with the device selected by the matrix are applied along lines 162, 163, and 164 to the memory address register 125. The output of the matrix 153 is also applied along lines 154 and 157 to a device code encoder 150. The device code encoder which will be described in detail in connection with FIG. 6 outputs a working device code in accordance with which of the eight lines out of the matrix was selected by the matrix as being of highest order priority. The output of the device encoder 150 is then applied along lines 151, 145 and 40 to the devices.

Further, as shown, the instruction register is connected along lines 136, 144 and 48 to an address decode 149. The function of the address decode 149 is to decode the three-bit working device code which is applied to the address decode to select one of eight lines addressing one of the input/output address registers in the store 158 during the initial loading of WDC's in the I/O devices.

An operational description of the execution of an I/O instruction will now be described. An I/O instruction is read from the main memory along line 128 through main data register 130, along lines 131 and 132 into the instruction register 133. The OP decode portion of the instruction illustrated in FIG. 3a is applied along line 134 to the sequence and control logic 143. The function portion of the word is applied along line 135 to the sequence and control logic 143 and the working device code portion, which for purposes of the present description is assumed to be three-bits in length to provide eight working device codes, is applied along lines 136, 144, 159, 163 and 164 to the memory address register 125. The actual device code store which is loaded under control of the supervisory program consists of eight words, one of which is selected by the particular working device code in the memory address register 125. Associated with each of the eight working device code areas is a five-bit actual device code again loaded under control of the supervisory program in accordance with which of the 32 I/O devices connected are to be worked with. The actual device code associated with the particular working device code is read out of the main memory along line 128 into the main data register 130 and thence along line 131 into alternate data register 138. It is then output from alternate data register 138 along buss 139 to the I/O devices. The devices each compare in their comparators 170 an 178 the actual device code transmitted on buss 139 with their local or wired actual device code. The I/O device which has an actual device code identical to that transmitted than signals to its device sequence and control unit 171–179 and the device sequence and control unit then acts to store the working device code which is simultaneously applied from the instruction contained in the function field of the instruction register 133 to line 40. The selected device also stores information regarding the function, e.g. input, output, status test, it is to perform. This sequence of loading the devices with working device codes into the working device code registers 168–175 may continue until up to eight of the devices are loaded with their assigned working device codes. During subsequent processing when a device desires servicing it, under control of its own device sequence and control logic, causes the working device code stored in its working device code register to be applied to its decode unit 172–180 and the decode unit then decodes the working device code and selects one of the eight interrupt request lines. The matrix 153 in the CPU 1 as previously described then determines which of the I/O devices during simultaneous interrupt requests is of highest priority and along lines 156 and 157 selects the appropriate input/output address register. The output of matrix 153 is also applied to the device encoder 150 which in turn decodes the output of the matrix into a working device code corresponding to the working device code of the selected device and this working device code is output along lines 151, 145 and 40 to the I/O devices. This working device code is then applied to the comparators 159–176 which also receive an input from the working device code registers 168–175 and the device having the identical working device code assigned to it as that broadcast then signals it's sequence and control unit 171 that it is the selected device. The selected device activates the timing and control buss in accordance with whether it is performing an input or output function in order that the CPU may respond accordingly. The selected device gates data stored in its data register 167 onto the data buss 139 or accepts data from the data buss into the data register depending on whether an input or output function, respectfully is being performed. In the CPU the input/output address register contents are transferred to the memory address register. If the operation is input as indicated by the device, the sequence and control logic 143 sequences the CPU so as to transfer the input data from the data buss 139 through the alternate data register 138 through the adder 46 to main memory 127 via lines 147 and 161. If the operation is an output, the CPU is sequenced so as to read data from main memory 127 into the alternate data register 128 via main data register 130. The data is gated onto the data buss 139 from the alternate data register 138. This type of interrupt is well known by those skilled in the art as a cycle-steal interrupt.

Figure 5:
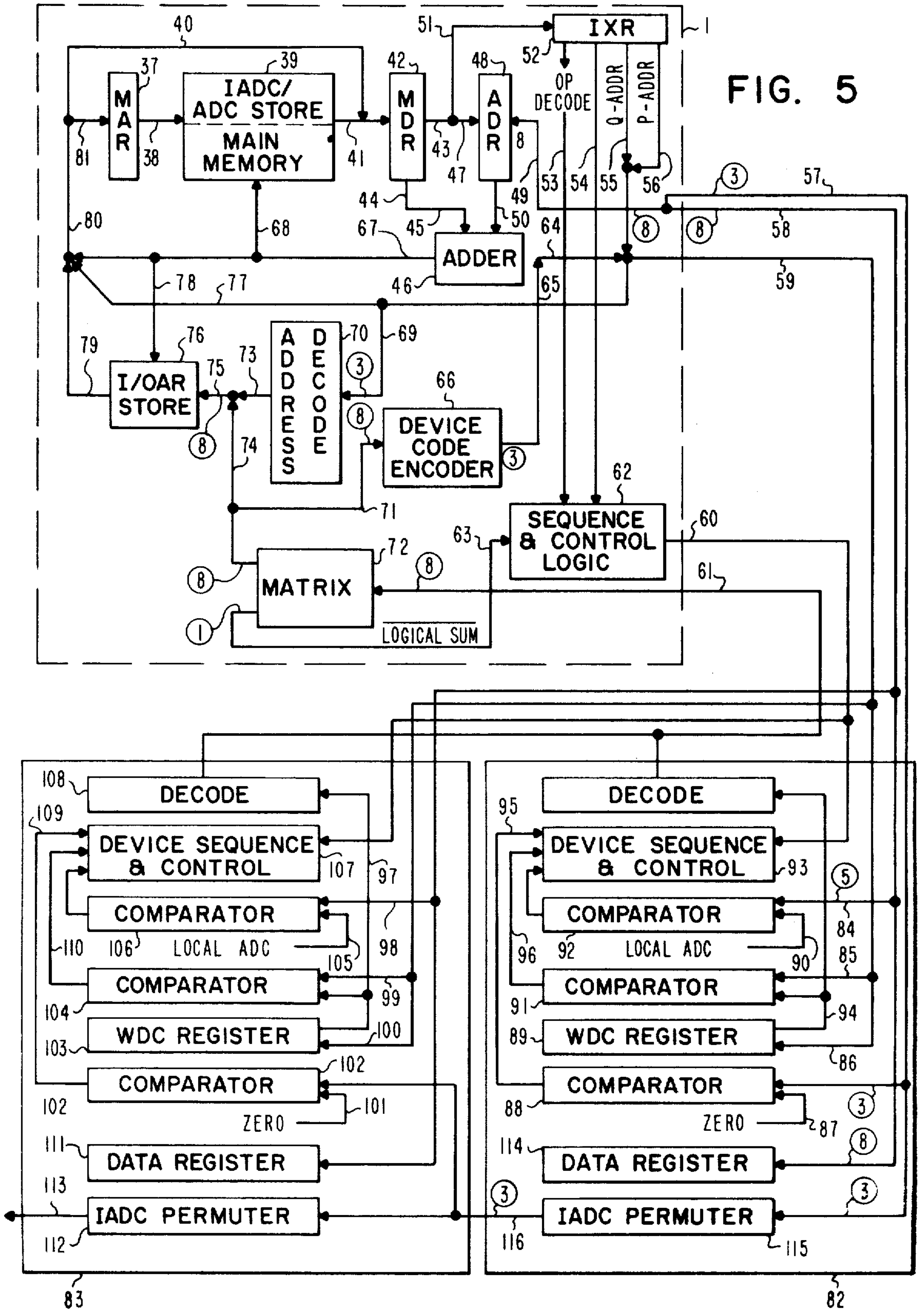
FIG. 5 is a detailed drawing of the CPU and I/O devices of FIG. 1 where certain of the I/O devices have identically addressed devices codes and are hooked in tandem with respect to the processor.

In FIG. 6 is shown a logical schematic of the address encode unit 150 while in FIG. 7 the truth table associated with the schematic of FIG. 6 is shown. In FIG. 7 in the column entitled "Line" the designations IRR 1 through IRR 8 are shown. These designations correspond to the input to the matrix 153 of FIG. 4. The output of the matrix 153 of FIG. 4 is one of the lines IRR 1' through IRR 8' being brought up in accordance with the priority determined in the matrix. In the nomenclature employed herein the output of the matrix is shown as a prime and therefore, since the inputs to the device code encoder 150 are tied to the lines from the matrix 153 the lines of FIG. 5 are also shown as primes.

All of the prime inputs to each of the logic blocks of FIG. 6 are ORED together such that, referring for example to IRR 8', $DV_1 - DV_3$ must be at a positive logical level if IRR 8' is true. Further, as shown in FIG. 6 and the truth table of FIG. 7 a bit pattern of all zeros will result when IRR 1' is brought up. Likewise, a bit pattern in which all of the bits except $DV_1$ are 0 results when IRR 2' is brought up. In like fashion unique bit patterns result on lines $DV_1 - DV_3$ for the selection of any of the input lines IRR 1' through IRR 8'.

It will be obvious to those skilled in the art that the above described technique in which a working device code is assigned to the I/O devices by means of the supervisory program provides great flexibility in systems architecture. That is, the actual hookup of the devices is unimportant with respect to assignment of priority in that the working device code can be assigned in a manner such that any priority scheme can be implemented no matter what the actual physical hookup of the devices is like. It will further be appreciated that with only an eight input variable matrix, eight input variable device encoder and a three-bit address decode unit that the number of circuits in the CPU has been reduced as compared to the aforementioned working device code application. Further, a net reduction in circuits is realized in the overall system for installations in which only a small number of devices are attached. These installations being less flexible are more likely to be sensitive to cost than systems in which a large number of devices are attached.

To facilitate an appreciation that the subject diminished matrix technique does not require modification in terms of data paths of the usual processor an arithmetic instruction will be briefly described and compared to an I/O instruction. In the arithmetic instruction as shown by reference to FIG. **3*b* the function is two-bits in length as distinguished from the function in the I/O instruction field which is four-bits in length. The OP codes are the same length. In both instructions the OP code and the function are fed to the sequence and control logic 143 to control operation of the processor. The Q address is five-bits in length and the P register address is five-bits in length in the arithmetic instruction. The Q address is utilized in the arithmetic instruction to select along lines 136, 159 and 160 a general purpose register located in main memory, while in the I/O instruction, the same field which is three-bits in length is used to address through the memory address register 125 a word in main memory 127 whose contents is one of the eight actual device codes which is then used to select one of the I/O devices. Additionally, in the arithmetic instruction the P register corresponds to a register address in a manner identical to the I/O instruction. This five-bit address is applied to the memory address register 125 which then provides a word in memory from which data is to be obtained which for purposes of the present description is applied to ADDER 46. With either instruction, this field, i.e. the Q-address or the working device code field, is transferred to the memory address register 125 and used to address memory. The implied high order bits of the address may be the same or different depending on the purposes of the design and are determined by the sequence and control logic 143**.

Refer next to FIG. 5 for a description of an embodiment which in a systems configuration can utilize I/O devices which have identical actual device codes and yet still operate in the manner of the CPU's and I/O devices of FIG. 4 to provide flexibility in assignment of priorities. In FIG. 5 the CPU 1 operates identically to that of the CPU 1 of FIG. 4 with the only exception being the length of the address obtained from the memory 39 when the working device code is used to obtain the actual device code. In the memory 39 there is included not only an ADC store but there is additionally included an IADC or identically addressed device code. The number of bits included in the word addressed is adequate to store an IADC in addition to the ADC. The ADC during selection of the devices for storage of the working device code is applied along line 58 to the devices and the devices, as described in connection with FIG. 4, then store the working device code which is simultaneously transmitted along line 59 from the processor. Thus, again, the device having an actual device code wired into it corresponding to that transmitted stores the transmitted working device code; however, there is an additional requirement that the IADC received by the device be zero.

Referring specifically to the I/O device 82 which is identical to I/O device 83 and any of the other devices hooked in tandem, the device like the I/O devices of FIG. 4 has a comparator 91 which compares the working device code stored in register 89 to determine whether or not, in the event it requested an interrupt, it is of the highest priority. Again as described in connection with FIG. 4 the working device code of the device which is of highest order priority is output by the device code encoder 66 of the CPU. Further, as was true with respect to the I/O devices of FIG. 4 each device has a local or wired ADC in it and this local or wired ADC is compared in comparator 92 with an ADC transmitted along line 58 from the CPU. In the event that a compare is positive during the execution of an I/O instruction the device will store the working device code which is simultaneously transmitted along line 69 from the I/O instruction which is held in instruction register 52. The only difference between the systems of FIGS. 4 and 5 is the addition of a comparator 88 and IADC permuter 115 in the I/O devices. The comparator 88 receives an input as previously described for the ADC from the main memory 39 along line 57. With a three-bit code six I/O devices can be connected in tandem when using the permuter of FIG. 8. The only function of comparator 88 is to compare the transmitted IADC with zero and indicate to the device sequence and control 93 whether or not the transmitted IADC is equal to zero. This is true of all of the other devices connected to the first device which as shown in FIG. 5 is device 82. The IADC permuter 115 in device 82 along line 116 outputs a zero code to comparator 102 of device 83 in the event that device 83 is the selected device. Device 83 in turn outputs from its IADC permuter 112 all zeros to the next device along line 133 in the event that the next device is the selected device in accordance with the IADC code.

For a better understanding of the above briefly described permutation sequence refer next to FIGS. 8 and 9. FIG. 8 illustrates one type of permuter and FIG. 9 is a truth table illustrating the permutation of the transmitted code from device to device. Thus, as shown in FIG. 8 assumming that permuter 184 is the permuter in the first device of the tandem arrangement and permuter 185 is the permuter of the second device in the tandem arrangement, if as shown in the code chart a zero or low logical level is applied to each of the lines 187, 188 and 189 the permuter 184 will rearrange the order bits in the code and invert the signal applied to line 189 such that a code pattern of 100 is input to the next permuter 185. The code is further permuted with respect to each of the subsequent devices 3 – 6 as shown in the truth table. All devices receive a unique code with only the first device receiving a code of zero and being thereby selected. To select the second device the IADC which is transmitted must correspond to 001 applied to lines 187, 188 and 189 respectively. With application of this code pattern the first device will receive a 001 and it will not be the selected device while the inversion by inverter 186 of the first permutator will cause a 000 code to be transmitted to the second device which in turn is the selected device since this causes a compare to zero. As shown, further permutations in the subsequent devices cause all of them to be not equal to zero. The above holds true with respect to selection of the other devices as shown in the code table of FIG. 9.

In the above described manner there has been provided a system and an alternate system which allows great flexibility in cabling of a CPU and associated I/O devices. This flexibility is obtained by a technique of indirect addressing of an actual device code to identify a device which is to be loaded with an assigned working device code which working device code is assigned by the supervisory program in accordance with the priority arrangement desired. This working device code then is used as an identifier both to signal an interrupt to the CPU and to allow the CPU to address one of the I/O devices. Furthermore, a number of devices in excess of the number which is directly provided for in terms of interrupt levels (matrix inputs), input/output address registers, and address codes specified in the I/O instruction may be attached to the system. In the alternate embodiment provision is made for allowing devices having identical actual device codes to be hooked in tandem such that identical devices can be used. The above is accomplished with a minimum of hardware changes to the usual functions found in a CPU since the busses normally associated with a CPU and registers are utilized to accomplish all of the heretofore described functions.

While the invention has been particularly shown and described with reference to several embodiments, it will be understood by those skilled in the art that various changes in form and detail may be made without departing from the spirit and scope of the invention.

What is claimed is:

1. A method of controlling a plurality of I/O devices by a processor comprising the steps of
- connecting said I/O devices by means of busses with each of said devices being directly addressable by said processor,
- assigning a unique actual device code to each of said devices,
- loading in the memory of said processor the actual device codes of said devices to be addressed by said processor,
- assigning a working device code to each of said devices which are in use and using said assigned working device code to address said actual device codes in memory,
- transmitting from memory an actual device code and said working device code to all of said devices,
- comparing said transmitted actual device code transmitted with said actual code assigned to each of said devices and storing said working device code in said device having an assigned actual device code equal to that transmitted.

2. The method of claim 1 further including the step of addressing said devices by said processor by subsequently transmitting said working device code and comparing said subsequently transmitted working device code with said stored working device codes to signal the addressed device.

3. The method of claim 1 wherein each of said I/O devices is attached to the matrix in said processor by a number of interrupt request lines, said number being equivalent to the number of said working device codes and further wherein said stored working device codes are decoded by said devices to activate a corresponding interrupt request line during interrupt requests.

4. The method of claim 3 further including the steps of determining in said matrix which of several of said devices is of the highest order of priority and applying the output of said matrix to an encoder which generates a corresponding working device code which is transmitted to said devices which compare said transmitted working device code with their said stored working device codes to determine which of said devices is to be interrupt serviced.

5. The method of claim 4 further including the steps of during said initial loading of said working device codes in said devices, decoding said working device code to activate a line to select an input/output address register in said memory which register holds the address of the storage location in memory to be utilized by the corresponding device.

6. The method of claim 5 wherein the output of said matrix during interrupt requests is utilized to activate one of said lines to select an input/output address register in said memory which register holds the address of the storage location in memory to be next addressed by the device of highest priority.

7. The method of claim 1 further including a plurality of I/O devices having identical actual device codes, said plurality of devices being connected in tandem with respect to one another and the device addressed by said processor receiving an additional fixed-value code during selection by said processor.

8. The method of claim 7 further including the step of during selection of said tandemly connected devices, outputting a code to said tandemly connected devices which permuted through said devices results in the desired device and no other receiving the said fixed-value code which is detected by said device to indicate that it is being addressed.

9. A data processing system having an I/O instruction including a working device code field comprising:

a plurality of input/output devices each wired with a unique actual device code and each having a first comparator adapted to receive it's unique wired actual device code, said I/O devices further including a working device code store and a second comparator adapted to receive said working device codes, a central processing unit connect to each of said I/O devices, said central processing unit including an actual device code store which is addressed by the said working device codes and which holds actual device codes which are in use;

an input/output address register store storing addresses of storage locations in memory to be utilized by said devices, means for obtaining the actual device code from said actual device code store designated by said working device code field of said I/O instruction and for outputting said obtained actual device codes along with the said designating working device code to said I/O devices, an address decoder also receptive of said working device codes output to said I/O devices for selecting the unique input/output address register from said input/output address register store for use by the device corresponding to said working device code, and means for controlling said first comparator such that when a said output actual device codes compares with a said wired actual device code said output working device code is stored in said working device code store of the I/O device having a wired actual device code equal to said output actual device code.

10. The system of claim 9 further including a number of interrupt request lines connecting each of said I/O devices to said CPU, said number being the maximum number capable of being uniquely designated by said working device code.

11. The system of claim 10 further including a decoder in each of said I/O devices which is operative to decode said stored working device code to select one of said interrupt request lines for interrupt request.

12. The system of claim 9, further wherein said process or further includes a matrix connected to each of said interrupt request lines of said I/O devices, said matrix having its output connected to said I/OAR store such that a particular I/OAR is addressed in accordance with the output from said matrix.

13. The system of claim 12 wherein said matrix further includes a priority determination means such that when several I/O devices simultaneously request service, said matrix provides an address to said I/OAR store in accordance with the device having highest order priority.

14. The system of claim 13 wherein said central processing unit further includes a device code encoder connected to the output of said matrix operative to provide an output code to said device code buss in accordance with the output of said matrix which output from said device code encoder is applied to all of said I/O devices to indicate to said devices which device requesting service was selected by said matrix.

* * * * *